Nov. 15, 1960  O. G. PHILLIPS  2,960,075
ROTARY TYPE FLUID MOTOR
Filed Sept. 20, 1957  2 Sheets-Sheet 1

INVENTOR.
OMI G. PHILLIPS,
By CARROLL WEBERG,
EXECUTOR.
BY Jesse P. Whann
ATTORNEY Nov. 15, 1960  O. G. PHILLIPS  2,960,075
ROTARY TYPE FLUID MOTOR Filed Sept. 20, 1957  2 Sheets-Sheet 2

INVENTOR.
OMI G. PHILLIPS,
By CARROLL WEBERG,
EXECUTOR
BY
ATTORNEY.

United States Patent Office 2,960,075
Patented Nov. 15, 1960

2,960,075

ROTARY TYPE FLUID MOTOR

Omi G. Phillips, deceased, late of Los Angeles, Calif., by Carroll Weberg, executor, Bellflower, Calif., assignor of one-half to Hazel B. Phillips, Los Angeles, and one-half to John H. Rutledge, North Hollywood, Calif.

Filed Sept. 20, 1957, Ser. No. 685,132

1 Claim. (Cl. 121—90)

This invention relates in general to rotary type fluid motors, and relates in particular to a fluid motor especially adapted for use as part of a variable speed transmission having utility in automotive vehicles and for the driving of other types of equipment and machinery.

It is an object of the invention to provide a fluid motor having a rotor operating concentrically within a shell, this rotor having thereon a plurality of vanes which are supported for extension and retraction so as to make engagement at proper times with the peripheral wall of the shell, and simple and durable means for effecting extension and retraction of the vanes so that they will consecutively move into and out of the path of flow of a stream of fluid under pressure, said vanes being positively carried along by the moving fluid and thereby transmitting rotation to the rotor.

It is a further object of the invention to provide a fluid motor comprising a shell having a rotor concentrically mounted therein, the rotor being smaller in diameter than the shell so as to provide an annular space between them, the shell having an inwardly projecting dividing wall, with inlet and outlet ports on opposite sides of this dividing wall, and the rotor having vanes which move outwardly into the annular space contiguous to the inlet opening, into sliding engagement with the peripheral wall of the shell, and then retracting into the rotor as they approach the dividing wall, so that the vanes will pass across the inner end of the dividing wall.

It is a further object of the invention to provide a rotary fluid motor of the type described in the preceding paragraph wherein the dividing wall includes a body which is movable into engagement with the outer surface of the rotor, and being provided with means for urging the movable body into engagement with the rotor so as to hold leakage of fluid from one side to the other of the dividing wall.

It is a further object of the invention to provide a rotary fluid motor wherein each vane comprises a pair of plates in edge-to-edge relation, with tongue and groove interengagement between these edges and means for urging the plates laterally into pressural engagement with the side walls of the shell, thereby minimizing leakage of fluid past the edges of the vanes. This arrangement also compensates for change in dimension of the vanes and the shell as the result of temperature variations of the parts.

It is a further object of the invention to provide vanes having laterally projecting integral trunnions on which roller members are mounted to serve as followers.

A further object of the invention is to provide a rotary fluid motor having substantially identical cams on opposite sides of the rotor for effecting extension and retraction of the cooperating plates which form the vanes of the device.

Further objects and advantages of the invention may be brought out in the following part of the specification wherein some details have been explained for the purpose of amplifying the disclosure without intending, however, to limit the scope of the invention which is set forth in the appended claim.

Referring to the accompanying drawings which are for illustrative purposes only:

Figure 1:
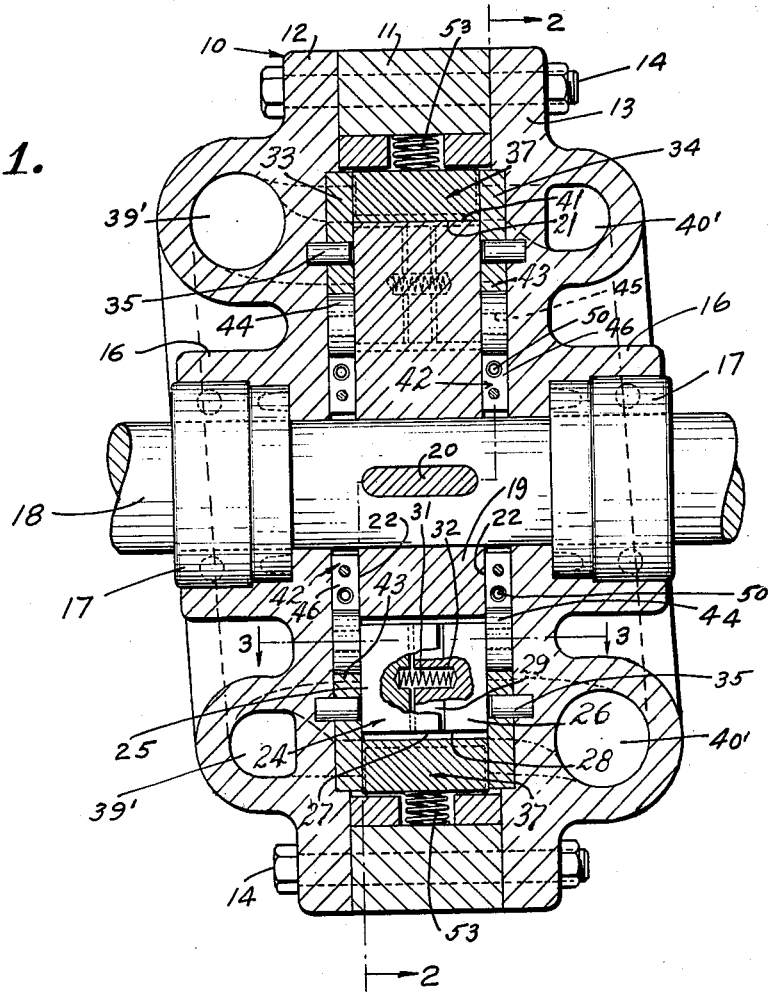
Fig. 1 is a longitudinal sectional view through a preferred form of the invention.

The fluid motor, as shown in Fig. 1, has a three-part shell 10 comprising a ring 11 and circular end plates 12 and 13 which are secured against the ends of the ring 11 by bolts 14. The ring 11 forms the peripheral wall of the motor and has an inner cylindrical face 15. End plates 12 and 13 have hubs 16 in which bearings 17 are arranged, for supporting a shaft 18 coaxial with the peripheral wall.

A cylindrical rotor 19 is mounted on the shaft 18 within the shell 10 and a key 20 is provided for transmitting rotation from the rotor 19 to the shaft 18. The rotor 19 has an outer cylindrical face 21 which is cylindrical and parallel to the face 15 of the ring 11, and has parallel side faces 22 which are perpendicular to the axis of rotation of the shaft 18. The rotor 19 has an uneven number, in the present instance 9, of radial slots 23 extending inwardly from the outer face thereof.

Figure 3:
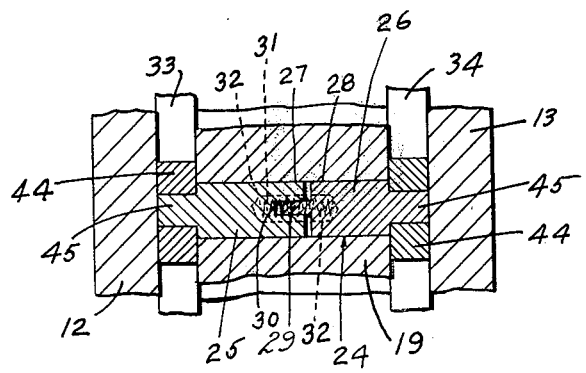
Fig. 3 is a sectional view taken as indicated by the line 3—3 of Fig. 1.

In each of the slots 23 a vane 24 is radially slidable, each vane 24 having a width the same as the width of the rotor 19 and having an end face adapted to engage portions of the inner face 15 of the peripheral wall or ring 12 as will be hereinafter described. Each vane 24 comprises a pair of rectangular plates 25 and 26 respectively having contiguous edges 27 and 28 which interengage through use of a tongue 29 and a groove 30 as shown in Fig. 3. A compression spring 31 contained in aligned openings 32 in the inner edges 27 and 28 of the plates 25 and 26, urge these plates 25 and 26 axially apart so that they will bear against the shell side walls formed by plates 33 and 34 the peripheral edges of which are circular. These plates 33 and 34 rest against the inner faces of the end plates 12 and 13 of the shell 10 and are prevented from rotation within the shell 10 by dowels 35.

An annular space 36 exists between the outer wall of the rotor 19 and the peripheral wall of the shell 10. Upper and lower diametrally disposed dividing walls 37 project inwardly from the peripheral wall 11 to engage the outer surface or wall 21 of the rotor 19, thereby dividing the annular space 36 into two annular passages 38 located on opposite sides of the dividing walls 37. Each arcuate passage 38 communicates with inlet and outlet ports 39 and 40 at the ends thereof and formed in the plates 33 and 34, and communicating respectively with passages 39' and 40' in the end plates 12 and 13.

Figure 2:
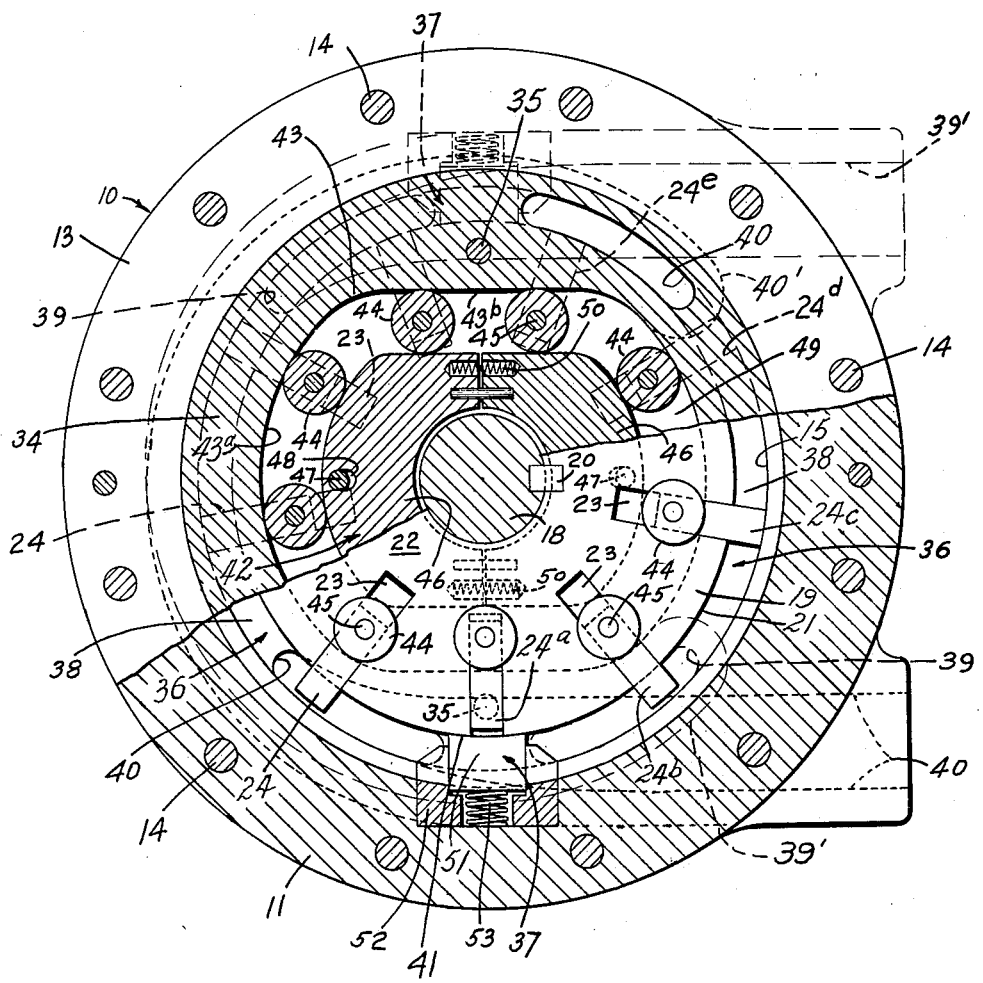
Fig. 2 is a cross-sectional view taken as indicated by the line 2—2 of Fig. 1.

Means are provided for moving the vanes 24 radially outwardly in the slots 23 so that the outer end portions of the vanes 24 will be in the path of flow of fluid through the passages 38 from the inlet ports 39 to the outlet ports 40, and then retracting the vanes 24 into the slots 23 so that the outer ends thereof will pass across the inner curved surfaces 41 of the dividing walls 37. For example, Fig. 2 shows a vane 24 in a position 24a wherein it is moving across the inner face of the dividing wall 37. Assuming that the rotor 19 is revolving in counter-clockwise direction, the vane 24 will be moved through the positions 24b, 24c, 24d, and 24e. As the vane moves from the position 24a to the position 24b it is moved radially outwardly, and its outer end face will come into engagement with the peripheral wall 11 at the rightward end of the inlet port 39. Thereafter, as the vane 24 moves through the positions 24c and 24d it will be held in engagement with the peripheral wall 11, and when the vane passes beyond the position 24d, moving in counter-clockwise direction, it will be retracted through the position 24e and will pass under the upper dividing wall 37. Since the vanes 24 are in continuous engagement with the side faces 22 of the shell and the ends of the vanes 24 are in engagement with the inner face 15 of the peripheral wall 11, there can be substantially no leakage past the vanes 24 and they will be positively moved along the arcuate passages 38 by the flows of fluid, such as a light transmission oil, for example, through the passages 38 from the inlet ports 39 to the outlet ports 40.

The extension and retraction of the vanes 24 is accomplished by cams 42 and 43 which engage cam followers 44 connected to the inner side portions of the vanes 24. The cam followers 44 consist of rollers which are turnable on trunnions 45 which project laterally from the inner ends of the vane plates 25 and 26.

The inner cams 42 comprise the outer, circularly curved portions of cam plates 46 which surround the shaft 18 on opposite sides of the inner portion of the rotor 19 and are prevented from rotation by pins 47 which pass from the adjacent portions of the shell 10 through elongated openings 48 in the cam plates 46. The outer cams 43 are formed by the inner edge portions of the plates 33 and 34 and define oval openings 49 in which the followers 44 travel. The cams 43 have portions 43a which are circularly curved and are parallel to the inner cams 42, and have flattened portions 43b which engage the outer portions of the followers 44 and move the vanes 24 inwardly as they approach the dividing walls. To compensate for wear, springs 50 between the inner edges of the inner cam plates 46 urge the cams 42 radially outwardly so that they will resiliently engage the inner portions of the cam followers 44 and hold the vanes 24 in pressural engagement with the peripheral walls 11 during portions of the time the vanes 24 are extending into the passages 38.

The dividing walls 37 each include a body 51 extending transversely of the arcuate passages 38, being wider than the slots 23 and being supported so that it can be moved inwardly into engagement with the outer wall of the rotor 19. The bodies 51 are supported in inserted guides 52 and springs 53 are positioned in the guides 52 so as to bear against the outer faces of the bodies 51 and urge them into pressural engagement with the outer wall 21 of the rotor 19, preventing undue leakage between the surface 41 and the outer wall 21 or the rotor 19 and compensating for wear between these parts.

I claim:

In a rotary fluid motor comprising a shell having an annular peripheral wall and side walls extending inwardly from the edges of said peripheral wall, a cylindrical rotor in said shell having an outer wall spaced from said peripheral wall of said shell and defining an annular space between said rotor and said shell, said rotor having slots extending inwardly from the outer face thereof, a pair of dividing walls in diametrically opposed relation extending inwardly from said peripheral wall to said outer wall of said rotor and dividing said annular space into two arcuate passages, each having a front end and a rear end, vanes in said slots movable from re-retracted positions within said slots to extended positions in contact with said peripheral wall, and walls forming inlet and outlet ports communicating with the front and rear ends of said arcuate passages: means for moving said vanes outwardly in said slots proximate to said inlet ports so as to lie in the path of fluid flow from said inlet ports through said passages to said outlet ports, and to retract said vanes back into said slots contiguous to said dividing walls so that the outer ends of said vanes will pass across the inner ends of said dividing walls, said means comprising cam followers projecting from the sides of said vanes; and outer and inner cam plates installed on the inner faces of said side walls for sliding engagement with the side face of said rotor, said outer cam plates being annular and providing an opening to receive said inner cam plates, said inner cam plates each comprising several parts and means operative between said parts urging same radially outwardly, the inner and outer edges of the respective outer and inner cam plates defining channels to receive said cam followers, which channels are generally circular in form with flattened portions operatively aligned with said dividing walls to effect retraction of the vanes as they approach the dividing walls.

References Cited in the file of this patent

UNITED STATES PATENTS

| | | |
|---|---|---|
| 619,129 | Bretherton | Feb. 7, 1899 |
| 625,446 | Hinson | May 23, 1899 |
| 695,296 | Fish | Mar. 11, 1902 |
| 870,290 | Henkel | Nov. 5, 1907 |
| 931,038 | Conn | Aug. 17, 1909 |
| 1,016,764 | Noyes | Feb. 6, 1912 |
| 1,320,892 | Munn | Nov. 4, 1919 |
| 1,644,490 | Post | Oct. 4, 1927 |
| 1,849,269 | Blackman | Mar. 15, 1932 |
| 2,393,223 | Rosen | Jan. 15, 1946 |
| 2,738,774 | Rosaen | Mar. 20, 1956 |
| 2,777,396 | Adams et al. | Jan. 15, 1957 |